July 1, 1969 J. R. BACON 3,453,555
HIGH SPEED DEFLECTION AMPLIFIER
Filed April 19, 1967
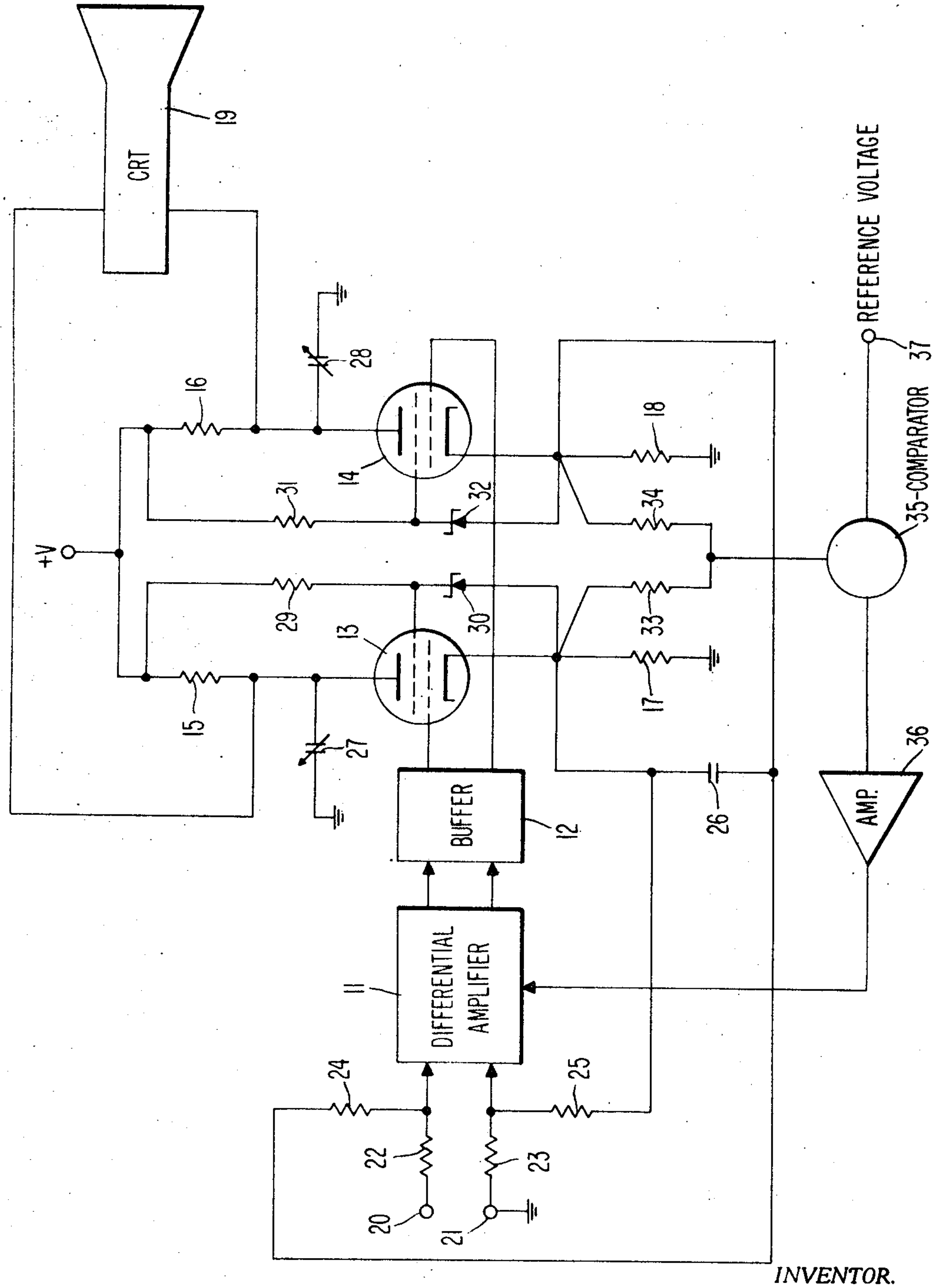
INVENTOR.
JAMES R. BACON
BY Thomas P. Murphy
ATTORNEY 3,453,555
Patented July 1, 1969

3,453,555

HIGH SPEED DEFLECTION AMPLIFIER

James R. Bacon, Philadelphia, Pa., assignor to Burroughs Corporation, Detroit, Mich., a corporation of Michigan Filed Apr. 19, 1967, Ser. No. 631,967
Int. Cl. H03f *3/54, 21/00*
U.S. Cl. 330—46 12 Claims

ABSTRACT OF THE DISCLOSURE

A deflection amplifier using negative feedback to provide gain stability and linearity wherein a differential amplifier input stage receives a differential negative feedback taken off the cathode of a dual tube output stage. The impedance of the cathode circuit is compensated to accommodate for changes in waveform at the plate circuit caused by taking the feedback from the cathode rather than the plates of the output stage. The output signals from the amplifier are taken from the plates of the output stage. The mean deflection voltage is held constant by means of a feedback loop connected from the cathodes to a differential stage in which the mean deflection voltage at the cathodes is compared to a reference voltage to automatically adjust for variations of the mean deflection voltage from a constant.

This invention relates to deflection amplifiers and more particularly, to a high speed deflection amplifier for use with large electrostatic cathode ray tubes.

Rapid communication to persons or machines of data processed in a computer is necessary if full advantage is to be taken of the high speed computers that are available today. Rapid presentation of the processed data must be made to individuals where human decision or evaluation is a necessary intermediate or final link in the computing process. Visual displays utilizing high speed cathode ray tube display systems readily lend themselves to such rapid communication or presentation to human beings.

For such visual displays electrostatically deflected cathode ray tubes have been found from the standpoint of gross position speed, bandwidth and writing rates to be advantageous over magnetically deflected cathode ray tubes.

However, deflection amplifiers used for such electrostatic deflection must provide high deflection voltages e.g., of the order of 3000 volts, in order to achieve full deflection, in a time compatible with the necessary speed of deflection. In displays of the type contemplated using large cathode ray tubes, e.g., those having a diameter of nineteen inches or more, this deflection must take place in 2 or 3 microseconds or less.

Inherently a cathod ray tube which is electrostatically deflected is best suited to differential deflection voltages. Thus, the deflection plates are respectively supplied with equal and opposing voltages which swing about a common or reference voltage. Needless to say, the best source of a differential voltage is a differential amplifier.

Therefore, use of differential amplifiers as a deflection amplifier for electrostatically deflected cathode rays is common to the prior art. In order to provide the necessary gain stability and linearity a differential feedback circuit is generally provided between the output stage and the input terminals of the differential amplifier.

Such prior art devices employ a differential amplifier and an output amplifying stage comprising a pair of vacuum tube amplifiers. The deflection and feedback voltages are taken from the plates of these amplifiers. Since the voltage at the plates is high (approximately 2000 volts), the feedback resistances must be high to limit current and wattage to values compatible with precision resistors. High resistances in the feedback circuits, however, are affected by stray capacity thus limiting the frequency response and affecting overall amplifier stability.

The present invention contemplates a deflection amplifier employing a differential stage and an output stage wherein feedback from the output stage to the input terminals of the differential stage is taken from the cathode resistors of the two vacuum tube amplifiers. Since the cathode voltages are many times lower than the plate voltages much lower values of feedback resistors can be used thus eliminating frequency response problems in this area. The unique circuit arrangement of the output stage which permits the novel combination of the present invention also permits a mean value correction loop to be connected between the cathodes and the differential stage to maintain the mean deflection voltage constant by appropriate control of the operating point of the output stage.

In accordance with the present invention a pair of vacuum tubes each having a control grid connected to one of the output terminals of the last stage of a differential amplifier have their plates connected to the deflection elements of an electrostatically deflected cathode ray tube. Each input terminal of the differential amplifier is connected to a cathode of the vacuum tubes via a feedback resistance. A capacitance is connected between the cathodes of the vacuum tubes to correct for plate waveform variation caused by feeding back from the cathodes and not the plates of the vacuum tubes. Means are also provided to cause a current to flow in the cathode resistors which is equal to the current which flows in the plate circuits thereby insuring essentially perfect linearity between plate current and the cathode voltage which is used for feedback. The design of the output stage also permits a simplified feedback circuit to be connected between the cathodes of the vacuum tubes and the differential amplifier to automatically adjust the operating point of the output stage to maintain the deflection voltage at a constant mean value.

The figure illustrates partially in block diagram form and partially in schematic form a preferred embodiment of the present invention.

Referring now more particularly to the figure, a multistage differential amplifier 11 is shown in block form. The differential amplifier 11 is conventional and in practice comprises three or more differential stages to provide the required gain. The differential amplifier 11 has a double ended input and output, i.e., it comprises two input terminals and two output terminals. Any difference in voltage at the input terminals appears as an amplified voltage across the output terminals.

One output terminal from the differential amplifier 11 is connected to the control grid of a first vacuum tube 13 while the second output terminal is connected to the control grid of a second vacuum tube 14. The vacuum tubes 13 and 14 may be tetrodes, as shown. The output terminals from the differential amplifier 11 are connected to their respective control grids via a buffer stage 12 which serves as a low output impedance device. The buffer stage 12 may include conventional emitter followers or other impedance lowering device.

The plates of the tubes 13 and 14 are connected to a common D.C. voltage power source +V through plate resistors 15 and 16. The cathodes of the tubes 13 and 14 are connected to ground through cathode resistors 17 and 18.

The plate of the tube 13 is connected to one of a pair of electrostatic deflection plates, e.g., the vertical pair of the cathode ray tube 19. The plate of the tube 14 is connected to the other of the pair of electrostatic deflection plates.

The double ended input of the differential amplifier 11 comprises a pair of input terminals 20 and 21. The input terminal 20 which is adapted to receive an input signal is connected to one side of the differential amplifier 11 via input resistor 22. The other input terminal 21 connects ground to the other side of the differential amplifier 11 via input resistor 23.

The cathode of the tube 14 is connected to the one side of the differential amplifier 11 through a resistor 24. The cathode of the tube 13 is connected to the opposite side of the differential amplifier 11 through resistor 25. A capacitor 26 is connected between the cathodes of the tubes 13 and 14.

Thus, differential feedback is provided between the cathodes of the output stage tubes 13 and 14 and the input terminals to the differential amplifier 11. Such feedback is required to assure good gain stability and linearity. Originating the feedback at the cathodes rather than the plates of the tubes 13 and 14 permits feedback resistors of lower value to be used than if the feedback originated at the plates because the voltage at the cathodes is of the order 200 times less than the voltage at the plates. More importantly, originating the feedback loops at the cathodes substantially improves frequency response and amplifier stability. For example, plate feedback with its high voltage necessitating a large resistance to limit feedback current incurs inaccuracies since use of a high feedback resistance is attendant with high stray capacitance in the feedback circuit. Such capacitance problems are virtually eliminated where low feedback resistances may be used. Also, as a result of cathode feedback efficiency is enhanced because plate voltage of the output stage can swing 5 to 10% further positive than it could if the feedback were taken off the plates.

However, the waveform of the plate voltage of the tubes 13 and 14 which is applied to the deflection plates of the cathode ray tube 19 will be distorted due to the reactive component existing in the plate load. This is a purely capacitance reactance due to plate capacitance, shunt and stray capacity of the resistors 15 and 16, etc. In order to maintain the gain at a constant value at high frequencies, the currents in the cathode circuits are made to have zeroes which cancel the poles of the voltage in the plate circuits. This is accomplished by use of capacitor 26. Since the plate time constant is known and remains constant, the value of capacitor 26 is easily chosen. Capacitor 26 adds capacitance to the cathode resistors 17 and 18 to cause the time constant of the cathode circuits to equal that of the plate circuits. Further, variable capacitors 27 and 28 connected, respectively, to the plates of the tubes 13 and 14 and ground may be used as trimmer capacitors to adjust plate capacity to known values to give some range of choice for the capacitor 26 and allow for variations of capacity in the cathode ray tube and stray wiring capacitance variations. This adjustment may be made by watching the cathode ray tube's screen and adjusting the capacitors for optimum step response as observed using known waveforms.

The output stage comprising the tetrode vacuum tubes 13 and 14 is designed to have essential perfect linearity. The plate current $I_p$ which flows in each side of the output stage, is composed almost totally of the cathode current $I_c$ minus the screen current $I_s$. Since the tubes 13 and 14 are in Class A operation exclusively, control grid and filament currents are completely negligible. Therefore, by causing a current equal to the cathode current $I_c$ minus the screen current $I_s$ to flow in the cathode resistor $I_r$ (which may be resistor 17 or 18) ideal linearity is achieved between cathode voltage and plate current.

That equality of the plate current and cathode resistor current stabilizes gain may be seen from a first order gain analysis of the output stage. Considering one side, i.e., tube 13 of the output stage:

$$\text{Gain of the output stage} = \frac{\Delta e_o}{\Delta e_i} = \frac{R_{15} I_p}{R_{17} I_{17}}$$

where $\Delta e_o$=change in plate voltage
$\Delta e_i$=change in voltage across resistor 17
$R_{15}$=resistance 15
$I_p$=plate current
$R_{17}$=resistance 17
$I_{17}$=current through resistor 17

Since $R_{15}$ and $R_{17}$ are constants $$\frac{\Delta e_o}{\Delta e_i} = \frac{R_{15}}{R_{17}}$$

where $I_p = I_{17}$.

In words then, gain equals the constant $R_{15}/R_{17}$ for the condition $I_p = I_{17}$.

To obtain this equality of currents a resistor 29 is connected between +V and the screen of tube 13 with a Zener diode 30 connected between the screen and cathode of tube 13. In a similar manner, a resistor 31 and Zener diode 32 are connected relative to the tube 14. Considering one side of the output stage, e.g., tube 13:

$$I_{30} = I_{dc} - I_s$$

where $I_{30}$=current through Zener diode 30
$I_{dc}$ is a known common mode D.C. current
$I_s$=screen current
$I_{17} = I_c + I_{dc} - I_s$
where $I_c$=cathode current
since $I_c = I_p + I_s$
then $I_{17} = I_p + I_s + I_{dc} - I_s$
therefore $I_{17} = I_p + I_{dc}$ The same may be shown for tube 14.

$$I_{18} = I_p + I_{dc}$$

Since the D.C. term is common mode, it is eliminated during feedback. Also, feedback taken from the cathodes does not feedback variations which occur at the plates due to power supply ripple and variations. These variations appear as common mode signals at the deflection plates and cause no deflection to occur. Ripple must be kept to a reasonable limit on the supply but presents no particular problem. The Zener diodes 30 and 32 are chosen to maintain their respective screens at a predetermined voltage, e.g., 200 volts.

In order to avoid astigmatic problems the mean deflection voltage is held constant over the deflection plate voltage swing. The mean deflection voltage is defined as one-half the sum of the plate voltages or ½ $(V_{p13} + V_{p14})$ where $V_{p13}$ is the plate voltage of tube 13 and $V_{p14}$ is the plate voltage of tube 14. This is accomplished by comparing the mean value of the voltages at the cathodes of the tubes 13 and 14 with a reference voltage and applying the resulting error voltage after appropriate amplification to the last stage of the differential amplifier at e.g., the common emitter junction for a differential amplifier using transistors.

The cathodes of tubes 13 and 14 are connected to one side of an error detector circuit 35 of any well-known design via resistors 33 and 34. Thus, an input representative of one-half the sum of the cathode voltages will be applied to the comparator 35. A reference voltage representative of the constant value of voltage at which it is designed to keep the mean deflection voltages is applied to the comparator 35 at terminal 37. Any error or differing voltage is applied to the last stage of the differential stage. The error voltage controls the total current in the differential amplifier to thereby automatically adjust the operating point of the output tubes 13 and 14 to maintain the mean deflection voltage at the desired constant value.

What is claimed is:

1. A deflection amplifier, comprising in combination:

a differential stage having first and second input terminals and first and second output terminals, an output stage including first and second vacuum tubes, first means connecting said first and second output terminals to the control grids of said first and second vacuum tubes, respectively, differential feedback means connecting the cathodes of said first and second vacuum tubes to said first and second input terminals, respectively, second means connected between the cathodes of said first and second vacuum tubes for increasing the rise time of the plate voltages of said first and second vacuum tubes.

2. A deflection amplifier according to claim 1 wherein said output stage comprises, circuit means for maintaining the gain of said output stage at a constant value.

3. A deflection amplifier according to claim 2 wherein said circuit means comprises, a resistor in the cathode circuit of each of said vacuum tubes, third means connected to said first and second vacuum tubes for equalizing the current in the plate and said resistor of each of said vacuum tubes.

4. A deflection amplifier according to claim 1 including, fourth means maintaining the mean average voltage across the plates of said first and second vacuum tubes at a constant value.

5. A deflection amplifier according to claim 1 wherein said second means comprises, a capacitor having a capacitance proportional to the stray capacitance in the plate circuits of said first and second vacuum tubes to compensate for waveform distortion due to said stray capacitance.

6. A deflection amplifier according to claim 5 wherein said output stage comprises, circuit means for maintaining the gain of said output stage at a constant value.

7. A deflection amplifier according to claim 6 wherein said circuit means comprises, a resistor in the cathode circuit of each of said vacuum tubes, third means connected to said first and second vacuum tubes for equalizing the current in the plate and said resistor of each of said vacuum tubes.

8. A deflection amplifier according to claim 7 including, fourth means maintaining the mean average voltage across the plates of said first and second vacuum tubes at a constant value.

9. A deflection amplifier according to claim 8 wherein each of said first and second vacuum tubes is a tetrode.

10. A deflection amplifier according to claim 9 wherein said third means comprises, a Zener diode connecting the cathode to the screen grid of each of said tetrodes, a resistance connecting the plate to the screen grid of each of said tetrodes.

11. A deflection amplifier according to claim 10 wherein said differential feedback means comprises, a pair of resistors connecting the cathode of said first and second tetrode to said first and second input terminals, respectively.

12. A deflection amplifier according to claim 11 wherein said fourth means comprises, a feedback circuit connecting the cathodes of said first and second tetrodes to said differential stage to maintain the operating point of said differential stage at a selected value.

References Cited

UNITED STATES PATENTS

| | | | |
|---|---|---|---|
| 2,853,650 | 9/1958 | Close | 350—26 X |
| 3,168,708 | 2/1965 | Stuart-Williams et al. | 330—69 X |
| 3,337,767 | 8/1967 | De Mutrichard et al. | 315—26 |

NATHAN KAUFMAN, *Primary Examiner.*

U.S. Cl. X.R.

315—26; 328—229; 330—69